US007233854B2

(12) United States Patent
Rayl et al.

(10) Patent No.: US 7,233,854 B2
(45) Date of Patent: Jun. 19, 2007

(54) METHOD FOR IMPROVING FUEL ECONOMY AND PERFORMANCE WHEN DEACTIVATING CYLINDERS WITH VEHICLE CRUISE CONTROL

(75) Inventors: Allen B. Rayl, Waterford, MI (US); Dennis M. Weglarz, Grand Ledge, MI (US); James C. Champlin, Fenton, MI (US); Nathan A. Wilmot, Waterford, MI (US); James G. Gehringer, Webberville, MI (US); William R. Venner, III, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 283 days.

(21) Appl. No.: 10/939,548

(22) Filed: Sep. 13, 2004

(65) Prior Publication Data

US 2006/0058939 A1 Mar. 16, 2006

(51) Int. Cl.
*B60K 31/00* (2006.01)
*G06F 7/00* (2006.01)

(52) U.S. Cl. .......................... 701/93; 701/85; 180/170; 123/352

(58) Field of Classification Search .................. 701/79, 701/93, 85; 123/352, 376; 340/441; 180/170
See application file for complete search history.

(56) References Cited

U.S. PATENT DOCUMENTS

| | | | | |
|---|---|---|---|---|
| 5,177,683 | A * | 1/1993 | Oo et al. | 701/93 |
| 5,260,876 | A * | 11/1993 | Oo et al. | 701/93 |
| 5,329,455 | A * | 7/1994 | Oo et al. | 701/93 |
| 5,646,850 | A * | 7/1997 | Ishida et al. | 701/93 |
| 6,278,931 | B1 * | 8/2001 | Crawford et al. | 701/93 |
| 6,670,256 | B2 * | 12/2003 | Yang et al. | 438/396 |

* cited by examiner

*Primary Examiner*—Y. Beaulieu
(74) *Attorney, Agent, or Firm*—Christopher DeVries

(57) ABSTRACT

A method for controlling the speed in a vehicle includes adjusting at least one gain parameter based on a vehicle speed error and the displacement on demand mode of the engine. A new cruise throttle area is calculated from the adjusted gain parameter.

20 Claims, 4 Drawing Sheets

METHOD FOR IMPROVING FUEL ECONOMY AND PERFORMANCE WHEN DEACTIVATING CYLINDERS WITH VEHICLE CRUISE CONTROL

FIELD OF THE INVENTION

The present invention relates to engine control systems for vehicles, and more particularly to a cruise control system for a displacement on demand (DOD) internal combustion engine.

BACKGROUND OF THE INVENTION

Cruise control systems are used to control vehicle speed and vehicle acceleration. When the cruise control system is active, a driver-selected speed is maintained without requiring the driver to operate the accelerator pedal. The cruise control system is manually activated and controlled by the driver via a cruise control input device. The cruise control system may be deactivated by the cruise control input device, application of a brake pedal and/or application of clutch pedal in vehicles with a manual transmission.

The cruise control system adjusts throttle area to control the speed of the vehicle. With electronic throttle control (ETC), an ETC module implements an ETC algorithm that adjusts the throttle area based on sensors, driver commands and/or cruise control algorithm commands.

The throttle valve controls the torque and speed of the engine by metering the supply of air to the engine. An engine controller modulates fuel based on an estimated airflow entering the engine. Sensors monitor the air flow to the engine and the amount of oxygen in the exhaust. The engine controller typically adjusts fuel delivery so that the air-to-fuel ratio is substantially equal to a stoichiometric value.

Some internal combustion engines (ICEs) include engine control systems that selectively deactivate cylinders under low load situations. For example, an eight-cylinder engine can be operated using four cylinders to improve fuel economy by reducing pumping losses. This process is generally referred to as displacement on demand (DOD). As used herein, activated mode refers to operation using all of the engine cylinders. Deactivated mode refers to operation using less than all of the cylinders of the engine (one or more cylinders not active). When cruise control is active and the engine is operating with minimal reserve torque in the deactivated mode, the DOD engine may frequently transition between the activated and deactivated modes based on changing road load conditions, which may cause perceptible torque disturbances and reduced fuel economy.

SUMMARY OF THE INVENTION

A speed control system and method according to the present invention for a vehicle includes a cruise control system and a displacement on demand (DOD) engine with DOD modes. A speed error module calculates a vehicle speed error. A gain selection module selects at least one gain value for at least one correction term of the cruise control system based on the vehicle speed error and the DOD mode of the engine. A throttle area module calculates a new throttle area based on a current throttle position that is adjusted by the at least one correction term.

In other features, the vehicle speed error is based on a difference between a desired speed setpoint and a vehicle speed. The DOD modes include an activated mode, a deactivated mode, an activation transition mode and a deactivation transition mode. The correction term includes at least one of a proportional term, an integral term and a derivative term. A plurality of the correction terms are used and wherein each of the plurality of correction terms includes a gain.

In yet other features, the gain selection module sets the gains of each of the correction terms to baseline over-speed values when the vehicle speed error is greater than an over-speed threshold value. The gain selection module reduces the gains of the correction terms to lower gain values when the vehicle speed error is less than an under-speed threshold value, the DOD engine is in the deactivated mode, and engine activation transition is not in process. The gain selection module at least one of generates and receives a reserved torque value and a torque threshold value. The gain selection module reduces the gains of the correction terms to lower gain values when the vehicle speed error is less than an under-speed threshold value, the DOD engine is in an activation transition mode, and the reserved torque value is not less than a torque threshold value. The gain selection module sets the gains to the baseline under-speed values when the vehicle is under-speed by less than an under-speed threshold value and the DOD engine is in the activated mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
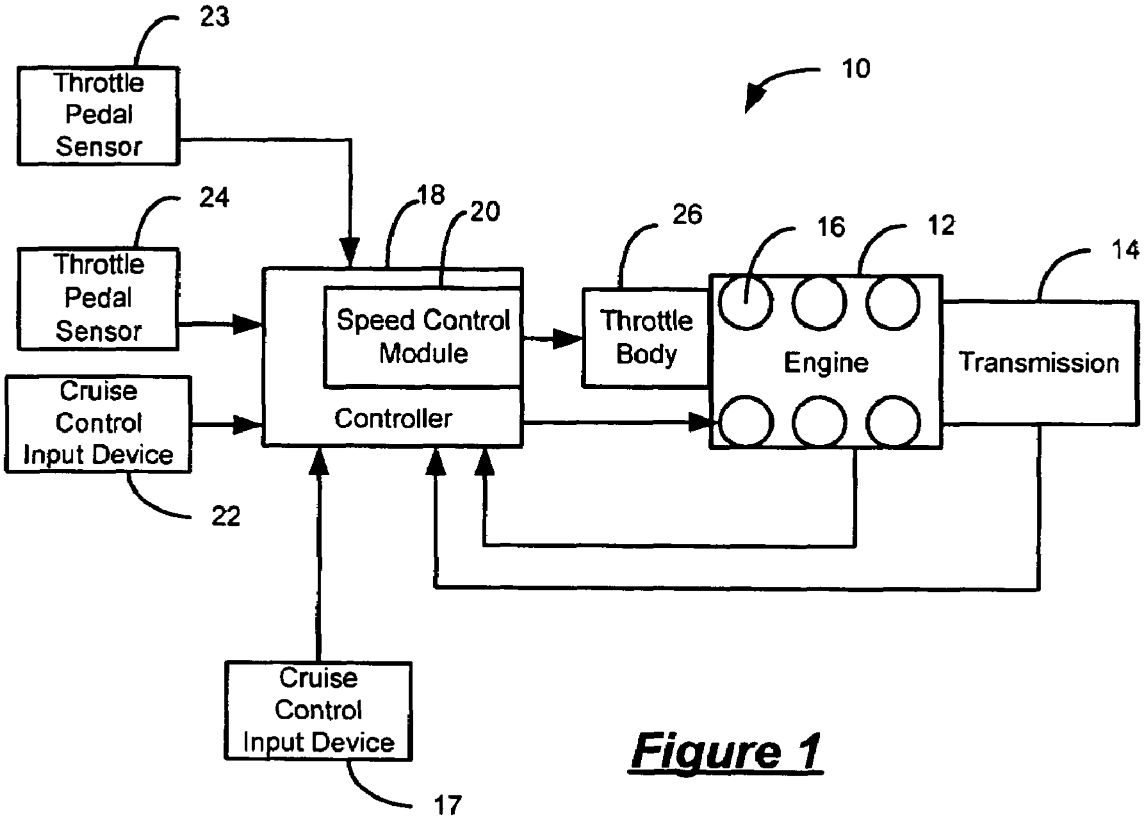
FIG. 1 is a functional block diagram of a vehicle with a displacement on demand engine and a controller including a speed control system.

The following description of the preferred embodiment(s) is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, or any other suitable components that provide the described functionality. For purposes of clarity, the same reference numbers will be used in the drawings to identify similar elements.

The present invention minimizes cylinder deactivations and improves fuel economy while controlling the speed of a vehicle when cruise control is active. At least one gain value for at least one correction term of a closed-loop speed control system is based on a vehicle speed differential and a displacement on demand mode of the engine. The vehicle speed differential is the commanded speed subtracted from the measured speed. A new throttle area is calculated based on the current throttle position and adjusted by the correction terms.

The correction term may include at least one of a proportional, integral or derivative term. Each correction term has it's own gain, which are set to baseline over-speed levels when the vehicle speed differential is greater than an over-speed threshold value.

The gains are reduced to lower values when one of the following two sets of criteria are met. The gains can be reduced to a lower value when the vehicle speed differential is less than an under-speed threshold value, the DOD engine is in the deactivated mode, and engine activation transition is not in process. The gains can also be reduced to lower values when the vehicle is under-speed, the DOD engine is in the activation transition mode, and a reserved torque value is not less than a torque threshold value. The gains are set to the baseline under-speed values when the vehicle is under-speed by less than an under-speed threshold value and the DOD engine is in the activated mode.

A new cruise control throttle area is not calculated when the vehicle speed is within a predetermined range from the desired speed set point. A new throttle area is also not calculated when the vehicle speed differential is less than an under-speed threshold, the DOD engine is in the activation transition mode and a reserved torque value is less than a torque threshold value.

Referring now to FIG. 1, a vehicle 10 includes an engine 12 that drives a transmission 14. The engine 12 includes N cylinders 16 that are selectively deactivated during engine operation. Although FIG. 1 depicts six cylinders (N=6) in a "V" arrangement, it can be appreciated that the engine 12 may include additional or fewer cylinders 16 and/or have an in-line configuration. For example, engines having 4, 5, 6, 8, 10, 12 and 16 cylinders are contemplated.

A controller 18 communicates with one or more engine operating sensors and/or environmental sensors, which are generally designated 17. The sensors may include oxygen sensors, mass air flow sensors, temperature sensors, engine and/or transmission speed sensors and the like. Other sensed parameters may be derived using models. During periods of light engine load, the controller 18 selectively deactivates one or more cylinders 16. In an exemplary embodiment, N/2 cylinders are deactivated. Upon deactivation of the cylinders 16, the controller 18 increases the torque output of the remaining cylinders 16 to maintain the desired engine power.

Figure 2:
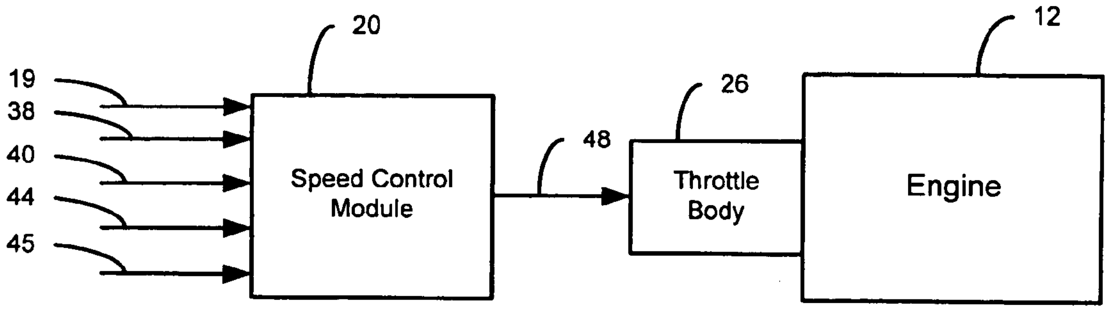
FIG. 2 is a functional block diagram of the speed control system including the speed control module.

Referring now to FIG. 2, during operation, the controller 18 selects a DOD operating mode of the engine and sends a mode signal 19 to the speed control module 20. The DOD operating modes include four modes: a deactivated mode with one or more of the cylinders 16 not operating; an activated mode with all of the cylinders 16 operating; a deactivation transition mode during which the engine 12 is transitioning from the activated mode to the deactivated mode; and an activation transition mode during which the engine 12 is transitioning from the deactivated mode to the activated mode. The controller 18 selects one of the four DOD modes, depending upon the operating conditions.

The speed control module 20 controls the speed and acceleration of the vehicle 10 when activated. The inputs to the speed control module 20 include, but are not limited to, inputs from the engine 12, the transmission 14, cruise control user inputs 22, a brake pedal sensor 23, and a throttle pedal position sensor 24. The inputs to the module 20 are used to control the throttle area in the throttle body 26.

Figure 3:
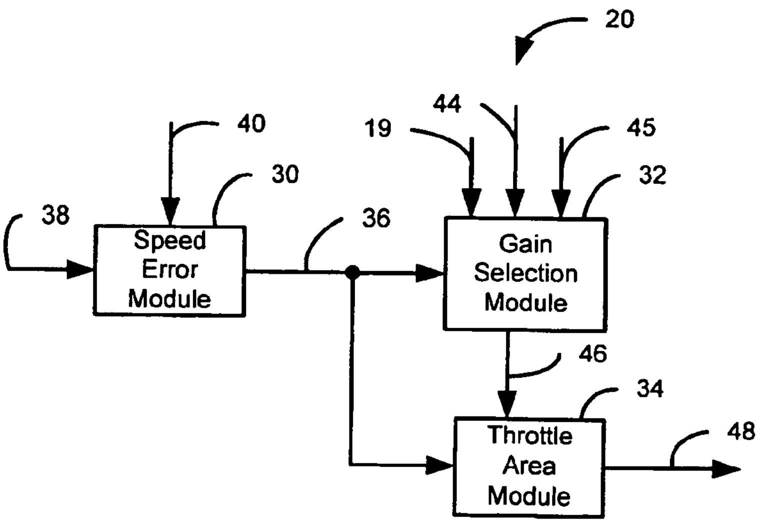
FIG. 3 is a more detailed functional block diagram of the speed control module of FIG. 2.
Figure 4:
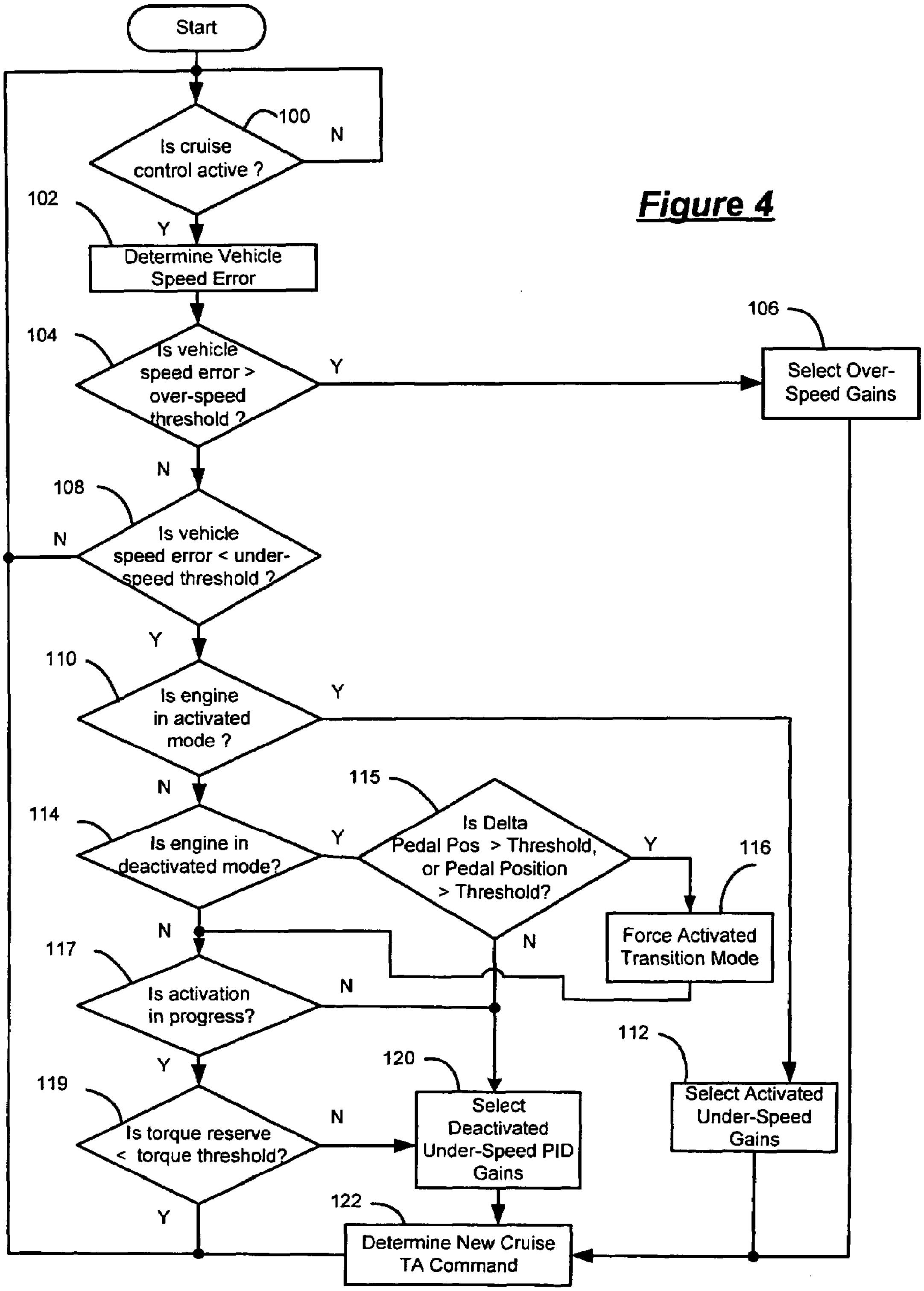
FIG. 4 is a flow chart illustrating steps performed by the speed control module.
Figure 5:
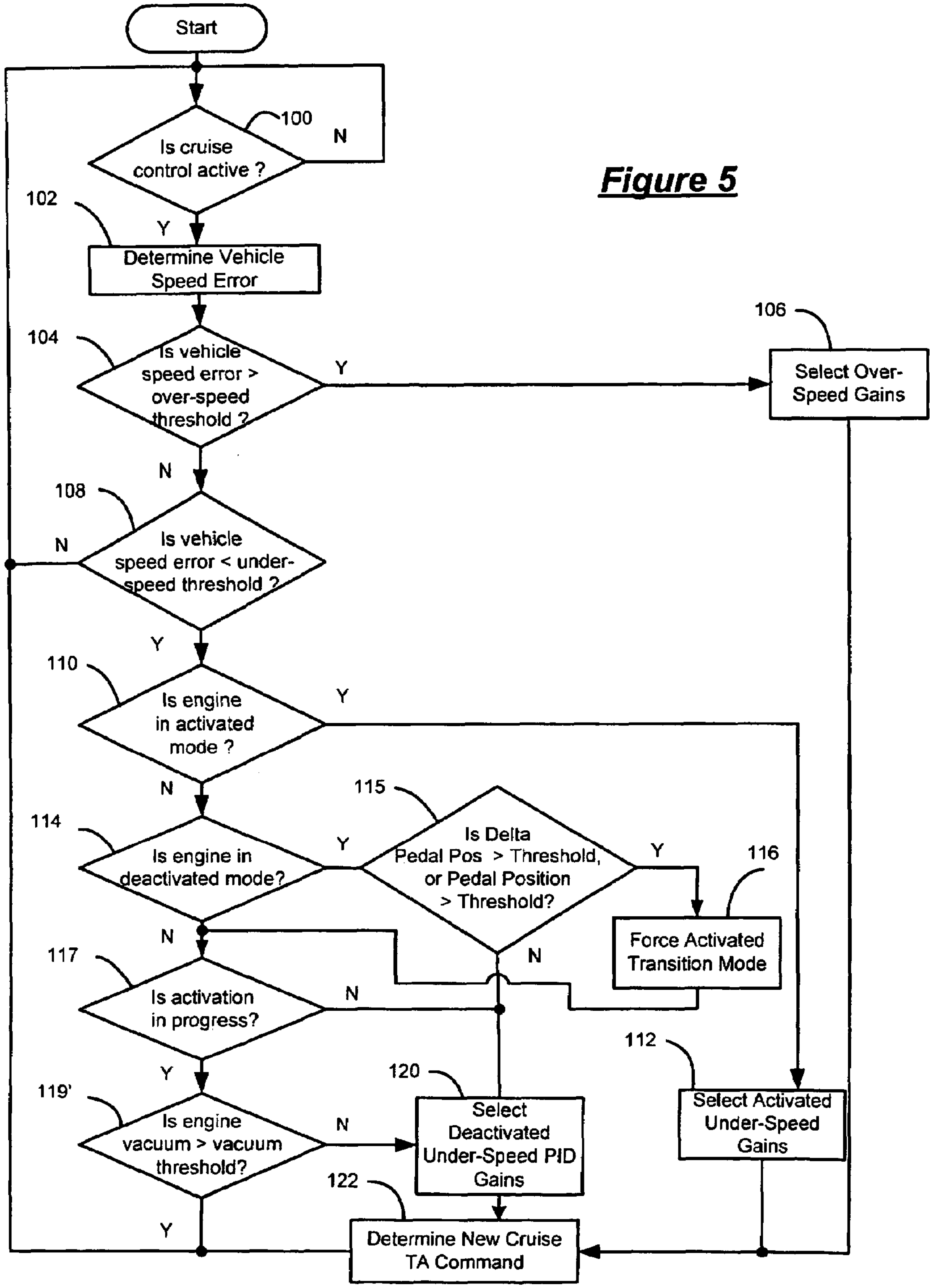
FIG. 5 is a flow chart illustrating steps performed by the speed control module in an alternate implementation.

Referring now to FIGS. 3, 4, and 5, the speed control module 20 includes a speed error module 30, a gain selection module 32 and a throttle area module 34. The speed error module 30 calculates a speed error 36 as shown in step 102 by calculating the difference between a measured vehicle speed 38 and a desired speed set point 40. The measured vehicle speed 38 can be measured and/or estimated from transmission output speed, estimated wheel speed or using any other suitable approach. The desired speed set point 40 is selected by the driver using the cruise control user inputs 22.

The gain selection module 32 determines the proper gains to be applied when the vehicle 10 is not operating within a predetermined range of the desired speed set point 40. Typically, higher gains reduce system response times. In other words, the cruise control system returns to the driver-selected speed set point 40 more quickly. The higher gains, however, also increase the probability of overshoot and instability. Conversely, lower gains increase system response times and do not respond as quickly and reduce overshoot and instability.

If the cruise control is not active in step 100, control flows back to step 100. If the cruise control is active in step 100, the speed error is determined in step 102. The gain selection module 32 compares the speed error 36 to an over-speed threshold and an under-speed threshold. If the speed error 36 is greater than an over-speed threshold value in step 104, over-speed proportional, integral and derivative (PID) gains are selected in step 106 and the new cruise throttle area 34 is determined in step 122. High over-speed PID gains can be used to quickly slow the vehicle 10 down without causing a DOD activation transition event because engine torque is being reduced.

In step 104, if the speed error 36 is not greater than the over-speed threshold value, control continues to step 108. In step 108, if the speed error 36 is not less than the under-speed threshold value, control returns to step 100. Otherwise, if the speed error 36 is less than the under-speed threshold value in step 108, flow continues with step 110 where the DOD mode 19 of the engine 12 is considered.

If the engine 12 is in the activated mode in step 110, the activated under-speed PID gains are selected in step 112 and control continues with step 122. If the engine is not in activated mode in step 110, control continues with step 114. If the engine 12 is in the deactivated mode in step 114, accelerator pedal position and delta accelerator pedal thresholds are evaluated in step 115 to determine whether the driver intends to accelerate past the desired speed set point 40. If the delta accelerator pedal position is not greater than the delta accelerator pedal threshold and the accelerator pedal position is not greater than the accelerator pedal position threshold in step 115, the driver does not intend to accelerate and the deactivated under-speed PID gains are selected in step 120. The deactivated under-speed PID gains are lower than the baseline activated under-speed gains. Control continues from step 120 to step 122 and then back to 100.

Lower deactivated under-speed PID gains allow vehicle speed correction while reducing undesired activation transitions caused by the torque request overshooting the maximum available deactivated mode torque when vehicle speed errors are small. If a delta accelerator pedal position 44 is greater than the delta accelerator pedal threshold or the accelerator pedal position 44 is greater than the throttle pedal position threshold in step 115, the activation mode is commanded in step 116. Control continues from step 116 to step 117. Forcing the activation transition mode based on accelerator pedal position changes reduces situations where the deactivated engine torque reserve is exhausted, which causes torque disturbances during the delay of the activation transition. If the engine 12 is not in deactivated mode in step 114, control continues with step 117.

In FIG. 4, if the engine 12 is in the activation transition mode in step 117, and a torque reserve value 45 is not less than a torque threshold in step 119, lower deactivated under-speed PID gains are selected in step 120. If the torque reserve is less than the torque threshold in step 119, deactivated engine torque reserve is exhausted, control bypasses step 122 and control returns to step 100. Alternatively and as shown in FIG. 5, if the engine 12 is in the activation transition mode in step 117, control continues with step 119'. If an engine vacuum value 45 is not less than an engine vacuum threshold in step 119', lower deactivated under-speed PID gains are used in step 120. If the engine vacuum value 45 is less than the engine vacuum threshold in step 119', control bypasses step 122 and control returns to step 100.

In both FIGS. 4 and 5, if the engine 12 is in not in the activation transition mode, by default, the engine 12 is in the deactivation transition mode. In this case, lower deactivated under-speed PID gains are used in step 120. Therefore, if the engine 12 is not in the activation transition mode in step 117, control continues with step 120.

In step 122, the PID gains selected in steps 106, 112, or 120 are used to determine the new cruise throttle area command. The throttle area module 34 uses the PID gains 46 determined by the gain selection module 32 to calculate the new cruise throttle area command 48. The throttle area module 34 calculates the new cruise throttle area using a PID or other similar calculation based on the gain values 46 and the determined speed error 36. There are some exceptions to determining the new cruise throttle area command. If the vehicle speed error 36 is less than an over-speed threshold and is greater than the under-speed threshold, the vehicle speed 38 is within a predetermined range of the desired speed set point 40. The cruise throttle area command 48 remains unchanged.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method for controlling the speed of a vehicle including a cruise control system and a displacement on demand (DOD) engine with DOD modes, comprising:

calculating a vehicle speed error;

selecting at least one gain value for a correction term of a said cruise control system based on said vehicle speed error and said DOD mode of said engine; and generating a new throttle area that is based on a current throttle position and that is adjusted by said correction term; and controlling a throttle of the vehicle based on the new throttle area to control the speed of the vehicle.

2. The method of claim 1 wherein said vehicle speed error is based on a difference between a desired speed setpoint and a vehicle speed.

3. The method of claim 1 wherein said DOD modes include an activated mode, a deactivated mode, an activation transition mode and a deactivation transition mode.

4. The method of claim 1 wherein said correction term includes at least one of a proportional term, an integral term and a derivative term.

5. The method of claim 1 wherein a plurality of said correction terms are used and wherein each of said plurality of correction terms includes a gain.

6. The method of claim 5 further comprising setting said gains of each of said correction terms to baseline over-speed values when said vehicle speed error is greater than an over-speed threshold value.

7. The method of claim 5 further comprising reducing said gains of said correction terms to lower gain values when said vehicle speed error is less than an under-speed threshold value, said DOD engine is in the deactivated mode, and an engine activation transition is not in process.

8. The method of claim 5 further comprising generating a reserved torque value and a torque threshold value.

9. The method of claim 8 further comprising reducing said gains of said correction terms to lower gain values when said vehicle speed error is less than an under-speed threshold value, said DOD engine is in an activation transition mode, and said reserved torque value is not less than a torque threshold value.

10. The method of claim 6 further comprising setting said gains to said baseline under-speed values when said vehicle is under-speed by less than an under-speed threshold value and said DOD engine is in the activated mode.

11. A speed control system for a vehicle including a cruise control system and a displacement on demand (DOD) engine with DOD modes, comprising:

a speed error module that calculates a vehicle speed error;

a gain selection module that selects at least one gain value for a correction term of said cruise control system based on said vehicle speed error and said DOD mode of said engine; and a throttle area module that calculates a new throttle area based on a current throttle position that is adjusted by said correction term.

12. The speed control system of claim 11 wherein said vehicle speed error is based on a difference between a desired speed setpoint and a vehicle speed.

13. The speed control system of claim 11 wherein said DOD modes include an activated mode, a deactivated mode, an activation transition mode and a deactivation transition mode.

14. The speed control system of claim 11 wherein said correction term includes at least one of a proportional term, an integral term and a derivative term.

15. The speed control system of claim 11 wherein a plurality of said correction terms are used and wherein each of said plurality of correction terms includes a gain.

16. The speed control system of claim 15 wherein said gain selection module sets said gains of said correction terms to baseline over-speed values when said vehicle speed error is greater than an over-speed threshold value.

17. The speed control system of claim 15 wherein said gain selection module reduces said gains of said correction terms to lower gain values when said vehicle speed error is less than an under-speed threshold value, said DOD engine is in the deactivated mode, and an engine activation transition is not in process.

18. The speed control system of claim 15 wherein said gain selection module at least one of generates and receives a reserved torque value and a torque threshold value.

19. The speed control system of claim 18 wherein said gain selection module reduces said gains of said correction terms to lower gain values when said vehicle speed error is less than an under-speed threshold value, said DOD engine is in an activation transition mode, and said reserved torque value is not less than a torque threshold value.

20. The speed control system of claim 16 wherein said gain selection module sets said gains to said baseline under-speed values when said vehicle is under-speed by less than an under-speed threshold value and said DOD engine is in the activated mode.

* * * * *